United States Patent [19]

Gautier et al.

[11] Patent Number: 5,021,547

[45] Date of Patent: Jun. 4, 1991

[54] CONTINUOUS POLYMERIZATION OF CO/OLEFIN IN PLURALITY OF REACTORS IN SERIES

[75] Inventors: Pieter A. Gautier; Maarten M. Geuze; Barend Mastenbroek; Leonardus Petrus, all of Amsterdam, Netherlands

[73] Assignee: Shell Oil Company, Houston, Tex.

[21] Appl. No.: 527,925

[22] Filed: May 24, 1990

[30] Foreign Application Priority Data

Aug. 7, 1989 [NL] Netherlands .......................... 8902019

[51] Int. Cl.$^5$ .............................................. C08G 67/02
[52] U.S. Cl. ..................................... 528/392; 526/65; 526/66
[58] Field of Search ..................... 528/392; 526/65, 66

[56] References Cited

U.S. PATENT DOCUMENTS 3,694,412  9/1972  Nozaki ........................ 260/63 CO

FOREIGN PATENT DOCUMENTS 121965  10/1984  European Pat. Off. .
181014   5/1986  European Pat. Off. .
213671   3/1987  European Pat. Off. .
257663   3/1988  European Pat. Off. .
305011   3/1989  European Pat. Off. .

Primary Examiner—Harold D. Anderson

[57] ABSTRACT

An improved process for the production of linear alternating polymers of carbon monoxide and at least one ethylenically unsaturated hydrocarbon by contacting the carbon monoxide and hydrocarbon under polymerization conditions in the presence of a catalyst composition formed from a palladium compound, a strong non-hydrohalogenic acid and a bidentate ligand of phosphorus, nitrogen or sulfur comprises conducting the polymerization in a continuous manner in two or more reactors connected in series.

16 Claims, No Drawings

CONTINUOUS POLYMERIZATION OF CO/OLEFIN IN PLURALITY OF REACTORS IN SERIES

FIELD OF THE INVENTION

This invention relates to an improved process of producing linear alternating polymer of carbon monoxide and at least one ethylenically unsaturated hydrocarbon. More particularly, it relates to a continuous process for conducting such polymerization in two or more reactors operated in series.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initators, e.g., peroxy compounds. G.B. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See U.S. Pat. No. 3,694,412, for example.

More recently, the class of linear alternating polymers of carbon monoxide and at least one ethylenically unsaturated hydrocarbon has become of greater interest in part because of the greater availability of the polymers. The more recent processes for the production of such linear alternating polymers, now known as polyketones or polyketone polymers, are illustrated by a number of published European Patent Application including 121,965, 181,014, 214,671, and 257,663 U.S. Pat. No. 4,899,462 as well as U.S. Pat. No. 4,965,341. The process typically involves the use of a catalyst composition formed from a compound of palladium, cobalt or nickel, the anion of a strong non-hydrohalogenic acid and a bidentate ligand of phosphorus, nitrogen or sulfur. The resulting linear alternating polymers are of relatively high molecular weight and are thermoplastic, being processed into articles of established utility by methods conventional for thermoplastics.

The actual polymerization process is conducted by a variety of procedures. In one embodiment, the process is conducted in a batchwise manner as by charging the monomeric reactants, catalyst composition and a reaction diluent to a suitable reactor and maintaining the reactor and contents at a suitable polymerization temperature. As such a batchwise polymerization proceeds, the pressure will drop, the concentration of the polymerization product in the diluent increases and the viscosity of the suspension of insoluble polymer in the reaction diluent also increases. In effect, the reaction temperature is the only reaction variable that remains constant. In a second embodiment, the process is conducted in a semicontinuous manner in which the reaction pressure is also kept constant by continuous addition of monomer to the reactor during polymerization. In these process modifications, the changes that do occur in the reaction variables result in a product of somewhat variable properties.

A better control over the product properties is obtained if the polymerization process is conducted in a continuous manner. In this embodiment, the monomeric reactants, the catalyst composition and reaction diluent are continuously added to the reaction zone. After an induction period in which the concentration of polymer in the suspension of polymer in the reaction diluent increases, a steady state is reached in which the polymer suspension is removed from the reaction zone at a rate substantially equivalent to the rate at which it is produced. As a result, the temperature, pressure, liquid volume and concentration of polymer in the suspension of polymer in reaction diluent are all kept relatively constant. A continuous type of process wherein the reaction variables are constant is easier to automate and therefore offers considerable practical advantages.

In published European Patent Application 305,011 such a continuous-type polymerization process is described. The disclosed process, however, takes place in a single polymerization reactor. It would be of advantage to provide an improved continuous process for the production of linear alternating polymers of carbon monoxide and at least one ethylenically unsaturated hydrocarbon.

SUMMARY OF THE INVENTION

The present invention provides an improved continuous process for the production of linear alternating polymers of carbon monoxide and at least one ethylenically)y unsaturated hydrocarbon. More particularly, the invention provides a continuous process for the production of such linear alternating polymers which employs at least two polymerization reactors operating in series. The present process provides for more efficient utilization of catalyst and produces a polymer product of relatively uniform properties.

DESCRIPTION OF THE INVENTION

The polymers produced according to the present invention are linear alternating polymers of carbon monoxide and at least one ethylenically unsaturated hydrocarbon and contain substantially one molecule of carbon monoxide for each molecule of hydrocarbon. The ethylenically unsaturated hydrocarbons which are useful as precursors of the linear alternating polymers have up to 20 carbon atoms inclusive, preferably up to 10 carbon atoms inclusive, and are aliphatic such as ethylene and other o-olefins including propylene, 1-butene, isobutylene, 1-hexene, 1-octene and 1-dodecene, or are arylaliphatic having an aryl group as a substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers produced according to the invention are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are produced there will be at least 2 units incorporating a moiety of ethylene for each unit incorporating a moiety of the second hydrocarbon. Preferably, there will be from about 10 units to about 100 units incorporating a moiety of ethylene for each unit which incorporates a moiety of the second hydrocarbon. The polymer chain of the preferred polymers is therefore represented by the repeating formula

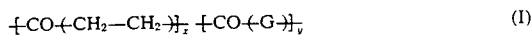 (I)

wherein G is the moiety of the second hydrocarbon of at least 3 carbon atoms polymerized through the ethylenic unsaturation thereof and the ratio of y:x is no more than about 0.5. When the preferred copolymers of carbon monoxide and ethylene are produced there will be no second hydrocarbon present and the copolymers are represented by the above formula I wherein y is zero. When y is other than zero, i.e., terpolymers are produced, the —CO—(CH₂CH₂)— units and the —CO—(G)— units occur randomly throughout the polymer chain and the preferred ratios of y:x are from about 0.01 to about 0.1. The end groups or "caps" of the polymer chain will depend upon what materials were present during the production of the polymer and whether and how the polymer was purified. The particular nature of the end groups does not appear to influence the properties of the polymer to any considerable extent so that the polymer is fairly represented by the polymer chain as depicted above.

Of particular interest are the polyketone polymers of number average molecular weight from about 1000 to about 200,000, particularly those of number average molecular weight from about 20,000 to about 90,000, as determined by gel permeation chromatography. The physical properties of the polyketone polymer are determined in part by the molecular weight, whether the polymer is a copolymer or a terpolymer and, in the case of terpolymers, the nature of and the proportion of the second hydrocarbon present. Typical melting points for such polymers are from about 175° C. to about 300° C., more often from about 210° C. to about 270° C. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polymers are produced according to the present invention using a catalytic quantity of a catalyst composition generally described in the above published European Patent Applications. Although the scope of the polymerization is extensive, and without wishing to be limited, a preferred catalyst composition is formed from a salt of palladium, the anion of a non-hydrohalogenic acid having a pKa below about 6 and a bidentate ligand of phosphorus, nitrogen or sulfur. Suitable palladium salts include palladium alkanoates and palladium acetate, palladium propionate, palladium butyrate and palladium hexanoate are satisfactory. Palladium acetate is preferred as the palladium salt. The anion precursor of the catalyst composition is preferably the anion of a non-hydrohalogenic acid having a pKa (measured in water at 18° C.) below 2. Suitable anions are oxygen-containing anions and are anions of inorganic acids such as sulfuric acid or perchloric acid or are anions of organic acids including carboxylic acids such as trichloroacetic acid, dichloroacetic acid and trifluoroacetic acid as well as sulfonic acids such as p-toluenesulfonic acid, methanesulfonic acid and trichloromethanesulfonic acid. Anions from trifluoroacetic acid or p-toluenesulfonic acid are preferred. The anion is preferably provided as the free acid but alternatively the anion is provided in the form of a non-noble transition metal salt such as a copper salt or a nickel salt. In yet another modification the anion is provided with the palladium as a single salt such as palladium trifluoroacetate. However provided, the anion is employed in a quantity of from about 1 mol to about 100 mols of anion per mol of palladium, preferably from about 2 mols to about 50 per mol of palladium.

The bidentate ligand from which the catalyst composition is formed is a bidentate ligand of phosphorus, nitrogen or sulfur. When a bidentate ligand of phosphorus is employed, the preferred ligands are bidentate phosphine ligands of the formula

$$R_2P-R'-PR_2 \qquad (II)$$

wherein R independently is an organic group of up to 10 carbon atoms which is aliphatic, cycloaliphatic or aromatic and is hydrocarbyl containing only atoms of carbon and hydrogen or is substituted hydrocarbyl containing additional atoms in the form of non-hydrocarbyl substituents. In the case of the bidentate phosphine ligands, the preferred R groups are aromatic and or hydrocarbyl or substituted hydrocarbyl containing one or more polar substituents at least one of which is ortho relative to the aromatic ring carbon atom through which the R group is connected to the phosphorus. Particularly preferred R groups are phenyl or 2-methoxyphenyl. The term R' in the above formula II is a divalent connecting group of up to 10 carbon atoms having from 2 to 4 carbon atoms in the bridge. Illustrative R' groups include 1,2-ethylene, 1,3-propylene, 1,2-butylene and 2,2-dimethyl 1,3-propylene. The 1,3-propylene or trimethylene group is preferred. The bidentate phosphine ligands are illustrated by 1,3-bis(diphenylphosphino)propane and 1,3-bis[di(2-methoxyphenyl)phosphino]propane. When a bidentate phosphine ligand is employed as precursor of the catalyst composition, it is provided in a quantity of from about 0.5 mol to about 2 mols per mol of palladium, preferably in an amount from about 0.75 mol to about 1.5 mol per mol of palladium.

When a bidentate ligand of nitrogen is used in the formation of the catalyst composition, the preferred nitrogen ligands are of the formula

(III)

wherein X independently is an organic bridging group of up to 10 carbon atoms containing from 2 to 4 atoms in the bridge at least two of which are carbon atoms with any remainder being nitrogen atoms. Illustrative of such bidentate ligands of nitrogen are 2,2'-bipyridine and 1,10-phenanthroline. When the catalyst composition of the invention is produced from a nitrogen bidentate ligand, the ligand is provided in a quantity of from about 0.5 mol to about 100 mols per mol of palladium. When employed, the nitrogen bidentate ligand is preferably provided in a quantity of from about 1 mol to about 50 mols per mol of palladium.

In the embodiment where a bidentate ligand of sulfur is utilized in the formation of the catalyst composition, the preferred bidentate sulfur ligands are represented by the formula

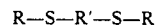

R—S—R'—S—R wherein R and R' have the previously stated meanings. In the case of a bidentate sulfur ligand, however, the R group is preferably aliphatic including arylaliphatic and R' is ethylene. Typical bidentate sulfur ligands are illustrated by 1,2-di(ethylthio)ethane and 1,2-di(benzlthio)e- thane. When sulfur ligands are employed, the sulfur ligand is provided in a quantity of from about 0.5 mol to about 100 mols per mol of palladium, preferably from about 1 mol to about 50 mols per mol of palladium.

Although any of the above ligands of phosphorus, nitrogen or sulfur is a suitable precursor of the catalyst compositions employed in the continuous polymerization process of the invention, the preferred bidentate ligands are bidentate phosphine ligands.

In order to enhance the activity of the catalyst composition it is useful on occasion to provide as an additional catalyst composition precursor an organic oxidant. Suitable oxidants include organic nitrites such as butyl nitrite and amyl nitrite, organic nitro compounds such as nitrobenzene and 2,4-dinitrotoluene, and quinones, both 1,2-quinones and 1,4-quinones. The 1,4-quinones such as 1,4-benzoquinone, 1,4-naphthoquinone and 1,4-anthraquinone are preferred as organic oxidants, particularly 1,4-benzoquinone. As stated, the presence of oxidant is not required and amounts of oxidant up to about 10,000 mols per mol of palladium are satisfactory. When oxidant is present amounts of oxidant from about 10 mols to about 5000 mols per mol of palladium are preferred.

Regardless of the particular type of bidentate ligand employed and the presence or absence of organic oxidant, sufficient catalyst is used to provide from about $1 \times 10^{-7}$ mol to about $1 \times 10^{-3}$ mol of palladium per mol of total ethylenically unsaturated hydrocarbon to be polymerized. The amount of catalyst used will preferably provide from about $1 \times 10^{-6}$ mol to about $1 \times 10^{-4}$ mol of palladium per mol of ethylenically unsaturated hydrocarbon. The catalyst is suitably introduced in one reactor or in more than one reactor. If the continuous polymerization process of the invention employs two reactors it is preferred to introduce at least 50% of the catalyst composition to the first reactor and more preferably at least 75% of the catalyst is introduced into the first reactor. Particularly good results are obtained in a two reactor system when substantially all of the catalyst composition is introduced into the first reactor. If the polymerization is conducted in more than two reactors, only a portion, e.g., at least about 75%, of the catalyst is introduced into the first reactor with the remainder being introduced into subsequent reactors, particularly the second reactor. No detriment occurs through introduction of the majority of the catalyst composition at a point early in the polymerization process since the catalyst composition is soluble in the reaction diluent and passes with unreacted monomer, the reaction diluent and the suspension of polymer product in the reaction diluent from any one reactor to subsequent reactors.

The process of the invention is conducted in the presence of an inert liquid reaction diluent. Suitable reaction diluents are those in which the catalyst composition is soluble but in which the polymer product is substantially insoluble. The preferred reaction diluents are alkanols such as methanol and ethanol. Methanol is particularly preferred as the reaction diluent. The molar ratio of carbon monoxide to total ethylenically unsaturated hydrocarbon is from about 10:1 to about 1:10 but preferably is from about 5:1 to about 1:5.

The continuous process is conducted by charging at least a portion of the reactant monomers, the catalyst composition and the reaction diluent to the first of at least two reactors operated in series. Although the number of reactors is in theory not limited satisfactory results are obtained when the reactor series has two or three reactors. The initial reactor, upon receiving the reaction mixture is maintained under polymerization conditions which typically include a reaction temperature from about 25° C. to about 150° C. but more frequently from about 30° C. to about 150° C. The reaction pressure is from about 2 bar to about 150 bar, preferably from about 5 bar to about 100 bar. The product of polymerization of the first reactor is then passed to a second reactor, together with additional monomer, reaction diluent and catalyst composition, if needed, where additional reaction takes place. If a third reactor is employed the product mixture of the second reactor is passed to the third reactor with any remainder of the monomer feed, reaction diluent and catalyst composition. From the terminal reacto of the series product mixture is withdrawn and any further reaction is terminated by cooling the mixture and releasing the pressure. The polymer product is substantially insoluble and is obtained as a suspension in the reaction diluent. The product is recovered by conventional methods such as decantation and filtration and is used as such or is purified as by contact with a solvent or extraction agent which is selective for catalyst residues.

The process of the invention is characterized by better control over the reaction variables than that which is available with batch or semi-continuous processes or continuous processes conducted in a single reactor. This better control is manifested in more uniform polyketone polymer product and in better utilization of catalyst, e.g., more polymer produced per unit quantity of palladium. The polyketone product is a thermoplastic polymer and is processed into a variety of shaped articles by methods conventionally employed with thermoplastics such as extrusion, injection molding and thermoforming. Among specific applications for the polyketone polymer are containers for food and drink as well as parts and housings for automotive applications.

The invention is further illustrated by the following Comparative Example (not of the invention) and the Illustrative Embodiments which should not be regarded as limiting. In the Comparative Example the polymerization was conducted in a single reactor. In Illustrative Embodiments I and II the polymerization was conducted in two reactors connected in series and in Illustrative Embodiment III the polymerization was conducted in three reactors arranged in series. In each reactor the temperature was maintained at 80° C. and the pressure was kept at 45 bar by discharging as necessary excess feed gas from the last reactor. Two catalyst compositions were employed. Catalyst composition I was formed from 1 liter of acetone, 1096 mg palladium acetate, 2136 mg 1,3-bis[di(2-methoxyphenyl)phosphino]propane and 1120 mg trifluoroacetic acid. Catalyst composition II was formed from 1 liter acetone, 1000 mg of palladium acetate, 2491 mg 1,3-bis[di(2-methoxyphenyl)phosphino]propane and 1067 mg trifluoroacetic acid. In each case the carbon monoxide/ethylene/propylene terpolymer product was examined by $^{13}$C-NMR analysis. The spectra were consistent with a linear alternating polymer in which units iron carbon monoxide alternate with units from either ethylene o propylene. The reaction parameters and product yields of Comparative Experiment I and Illustrative Embodiment I-III are shown in the Tables I-III.

TABLE I

| COMPARATIVE EXAMPLE/ILLUSTRATIVE EMBODIMENT | I | I | II | III |
|---|---|---|---|---|
| First Reactor | | | | |
| Reactor volume, liter | 150 | 100 | 13.6 | 13.6 |
| Feed rates | | | | |
| methanol, kg/hour | 5.75 | 4.30 | 5.75 | 4.30 |
| carbon monoxide, Nl/hour | 525 | 377 | 250 | 162 |
| ethene, Nl/hour | 875 | 597 | 375 | 389 |
| propene, kg/hour | 0.50 | 0.39 | 0.73 | 0.37 |
| catalyst solution I or II, ml/hour | I,22 | I,33.2 | I,23 | II,36.3 |
| Quantity by weight of suspension in reactor, kg | 83 | 41.5 | 7.3 | 3.6 |
| Palladium concentration in reactor, mg/kg methanol | 2.0 | 4.0 | 2.0 | 4.0 |
| Suspension concentration, % w | 9 | 11.6 | 1.7 | 1.9 |
| Quantity of polymer produced, g/hour | 650 | 638 | 90 | 94 |
| Reaction rate, kg polymer/g palladium.hour$^{-1}$ | 4.9 | 4.9 | 7.5 | 7.5 |
| Palladium utilization, g polymer/mg palladium | 56 | — | — | — |

TABLE II

| ILLUSTRATIVE EMBODIMENT | I | II | III |
|---|---|---|---|
| Second Reactor | | | |
| Reactor volume, liter | 150 | 150 | 100 |
| Feed rates | | | |
| methanol, kg/hour | 4.30 | — | — |
| carbon monoxide, Nl/hour | 278 | 270 | 362 |
| ethene, Nl/hour | 0.30 | 525 | 350 |
| propene, kg/hour | — | — | 0.02 |
| Quantity by weight of suspension in reactor, kg | 83 | 83 | 41.5 |
| Palladium concentration in reactor, mg/kg methanol | 2.0 | 2.0 | 4.0 |
| Suspension concentration, % w | 11.56 | 14 | 17.2 |
| Quantity of polymer produced, g/hour | 637 | 1000 | 914 |
| Reaction rate, kg polymer/g palladium.hour$^{-1}$ | 4.9 | 7.5 | 7.5 |
| Palladium utilization, g polymer/mg palladium | 74 | 92 | — |

TABLE III

| ILLUSTRATIVE EMBODIMENT | III |
|---|---|
| Third Reactor | |
| Reactor volume, liter | 150 |
| Feed rates | |
| methanol, kg/hour | 4.30 |
| carbon monoxide, Nl/hour | 390 |
| ethene, Nl/hour | 553 |
| propene, kg/hour | 0.30 |
| Quantity by weight of suspension in reactor, kg | 83 |
| Palladium concentration in reactor, mg/kg methanol | 2.0 |
| Suspension concentration, % w | 16.6 |
| Quantity of polymer produced, g/hour | 920 |
| Reaction rate, kg polymer/g palladium.hour$^{-1}$ | 7.5 |
| Palladium utilization, g polymer/mg palladium | 112 |

What is claimed is:

1. In the process of producing linear alternating polymer of carbon monoxide and at least one ethylenically unsaturated hydrocarbon by contacting the carbon monoxide and hydrocarbon under polymerization conditions in the presence of a liquid reaction diluent and a catalyst composition formed from a palladium compound, the anion of a strong non-hydrohalogenic acid and a bidentate ligand of phosphorus, nitrogen or sulfur, the improvement of conducting the contacting in a continuous manner in at least two reactors operating in series.

2. The process of claim 1 wherein the contacting is in two reactors.

3. The process of claim 2 wherein at least 50% of the catalyst composition is introduced to the first reactor.

4. The process of claim 3 wherein at least 75% of the catalyst composition is introduced to the first reactor.

5. The process of claim 1 wherein the contacting is in three reactors.

6. The process of claim 1 wherein at least 75% of the catalyst composition is introduced to the first reactor.

7. In the process of producing a linear alternating terpolymer of carbon monoxide, ethylene and propylene by contacting the carbon monoxide, ethylene and propylene under polymerization conditions in the presence of a liquid reaction diluent and a catalyst composition formed from a palladium compound, the anion of a non-hydrohalogenic acid having a pKa below 2 and a bidentate phosphine ligand, the improvement of conducting the contacting in a continuous manner in at least two reactors operating in series.

8. The process of claim 7 wherein the contacting is in two reactors.

9. The process of claim 8 wherein at least 50% of the catalyst composition is introduced to the first reactor.

10. The process of claim 7 wherein the contacting is in three reactors.

11. The process of claim 10 wherein at least 75% of the catalyst composition is introduced to the first reactor.

12. In the process of producing a linear alternating copolymer of carbon monoxide and ethylene by contacting the carbon monoxide and ethylene under polymerization conditions in the presence of a liquid reaction diluent and a catalyst composition formed from a palladium compound, the anion of a non-hydrohalogenic acid having a pKa below 2 and a bidentate phosphine ligand, the improvement of conducting the contacting in a continuous manner in at least two reactors operating in series.

13. The process of claim 12 wherein the contacting is in two reactors.

14. The process of claim 13 wherein at least 50% of the catalyst composition is in(produced to the first reactor.

15. The process of claim 12 wherein the contacting is in three reactors.

16. The process of claim 15 wherein at least 75% of the catalyst composition is introduced to the first reactor.

* * * * *